Jan. 29, 1952  H. K. HERRICK  2,583,843
MAGNETIC TYPE ONE-WAY CLUTCH
Filed Feb. 7, 1949
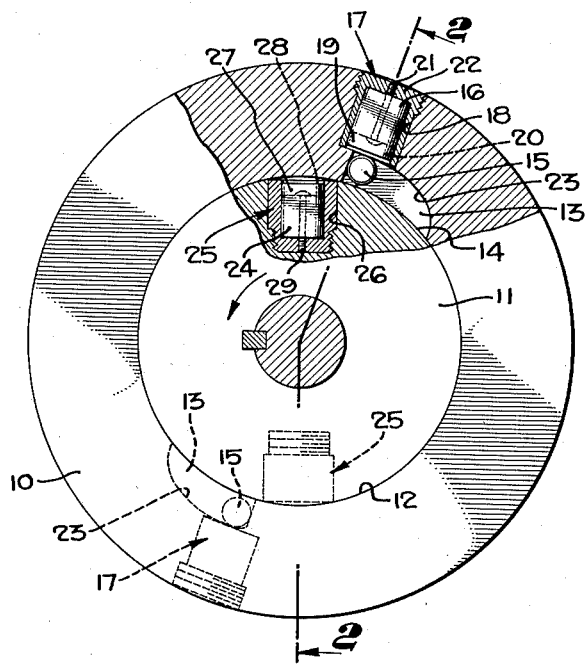
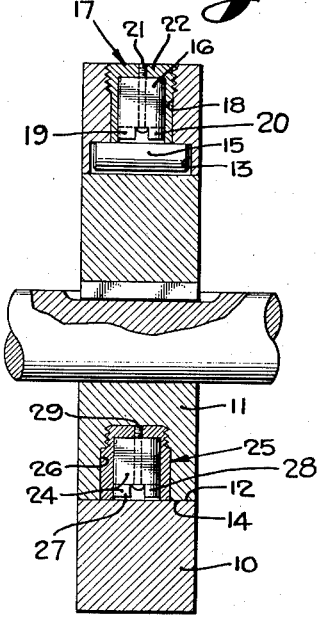
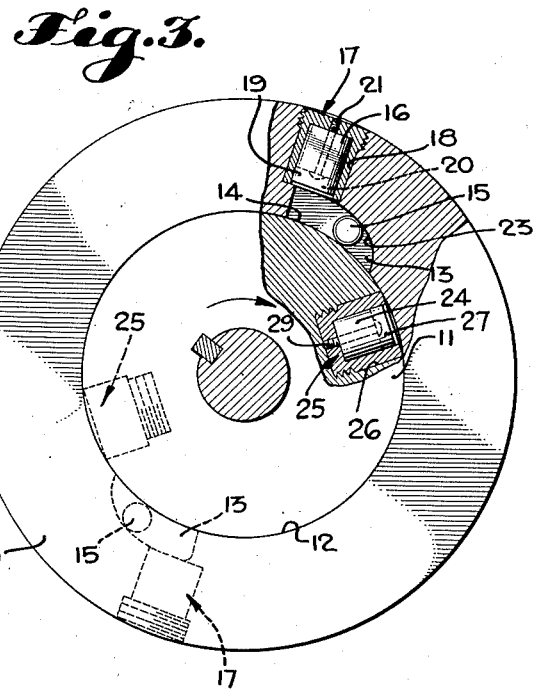
HOMER K. HERRICK,
INVENTOR.
BY John Flam
ATTORNEY Patented Jan. 29, 1952

2,583,843

UNITED STATES PATENT OFFICE 2,583,843

MAGNETIC TYPE ONE-WAY CLUTCH

Homer K. Herrick, Monrovia, Calif.

Application February 7, 1949, Serial No. 74,869

7 Claims. (Cl. 192—45)

This invention relates to releasable coupling mechanisms, particularly to those utilizing rolling elements. Such rolling elements perform the coupling action by being wedged between a pair of converging surfaces respectively on the members to be coupled.

Mechanisms of this character have been used for free wheeling devices, and for devices restraining a member from moving in a reverse direction.

A coupling is effected by the rolling elements when they are urged between the converging surfaces by relative movement of the members. Further relative movement of the members in this direction is prevented by the rolling elements being wedged between the converging surfaces. Relative movement in the other direction urges the rolling element from wedging relationship; further relative movement in this direction is not restricted.

Such mechanisms are ordinarily characterized by continued rolling of the rolling elements on one of the surfaces when free relative rotation is intended. Furthermore, considerable random movement of the rolling elements may be present. This motion of the rolling elements generates considerable frictional heat, particularly at high relative speeds, and it also produces substantial wear on the rolling elements and the members which it contacts.

It is an object of this invention to provide an improved clutch mechanism which obviates these difficulties.

It is another object of this invention to provide an improved clutch mechanism of this character which operates in a simple and efficient manner to move the rolling elements out of rolling engagement when the mechanism is unclutched, without the use of complex mechanical devices.

These results are accomplished by positioning permanent magnets on each of the relatively movable members. One of the magnets serves to restrain the rolling element from frictional contact, while the members are unclutched, by holding it to one member and out of contact with the other member. The other magnet serves to overcome the magnetic attraction of the first magnet and pull it into wedging relationship when the members are to be coupled together.

It is a further object of this invention to provide a mechanism of this character that is inexpensively manufactured and assembled.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is an elevation, partly in section, of an embodiment of the invention shown as a clutch mechanism for restraining reverse direction of rotation of a shaft, the shaft being shown as rotating in the desired direction;

Fig. 2 is a sectional view, taken along planes corresponding to lines 2—2 of Fig. 1; and Fig. 3 is an elevation, partly in section, similar to Fig. 1, but showing the clutch mechanism operating to restrain rotation in the reverse direction.

The one-way clutch mechanism comprises two relatively rotatable members, for example, a stator 10 securely fastened against movement by appropriate means (not shown) and a rotor 11 keyed to a rotatable shaft.

The stator member 10 is of annular form, the inner surface 12 thereof closely surrounding the rotor 11, but out of contact therewith. The stator 10 is provided with one or more circumferentially extending sloping slots or recesses 13. These slots 13 face the outer surface 14 of the rotor 11. Within each of these slots 13 is provided a rolling element of steel or other magnetic material, in this instance in the form of a roller 15.

The radial depth of the recess 13 is at one extremity greater than the diameter of the roller 15. At the other extremity of the recess the radial depth is substantially less than the diameter of the roller 15. The recess 13 is smoothly tapered between these extremities.

At each slot 13 adjacent the wide extremity is provided a magnet 16 for holding the rolling element 15 away from the rotor surface 14, when the rotor 11 is rotating in the direction indicated by the arrow in Fig. 1. For accommodating the cylindrical magnet 16, a non-magnetic housing or sleeve 17 is inserted into an appropriately provided recess 18 in the stator 10. This housing 17 is secured to the stator 10 by threaded engagement therewith.

The magnet 16 is illustrated as cylindrical in form, force fitted into the cylindrical interior of the housing 17. The magnet 16 is slotted to form the poles 19 and 20 and for defining the pole faces. Extending axially of the magnet 16, and between the poles 19 and 20, is a machine screw 21 threadedly engaging the end wall 22 of the non-magnetic housing 17. The housing 17 and magnet 16 may be assembled with the stator 10 as a unit.

The magnet and housing assembly are so positioned that the pole faces lie substantially flush with the tapered inner surface 23 of the recess 13, and preferably slightly outwardly of this surface. When the rotor 11 moves in the direction indicated in Fig. 1, the roller 15 is magnetically attracted to the pole faces and held entirely out of contact with the rotor surface 14 in order to prevent continued rolling of the roller 15 on the rotor surface 14, and for preventing random movement.

One or more permanent magnets 24, equiangularly spaced, are provided on the rotor 11. These magnets 24 are each similarly cylindrical in form, force fitted into a housing or sleeve 25, which is in turn accommodated in a recess 26 in the rotor 11, as by being threadedly secured thereto. The pole faces of these magnets lie flush with the rotor surface 14, and preferably slightly outwardly of this surface. Each magnet is similarly slotted to form the poles 27 and 28. Machine screws 29 extend axially of the magnet 24 and between the poles 27 and 28, fastening the magnet 24 to the housing or sleeve 25.

The magnets 24 on the rotor 11 are stronger than those on the stator 10 and they thus exert a stronger magnetic force on the roller 15. Thus, when the rotor 11 is moving as in Fig. 1, the rotor magnet 24 will pull the roller 15 to its most counterclockwise postion. The roller 15 may be slightly pulled from the pole faces of the stator magnet 16 when the rotor magnet 24 sweeps past. As soon as the rotor magnet 24 passes sufficiently from radial alignment with the roller 15, the stator magnet 16, now being closer to the roller 15, will exert the greater force on the roller 15 and snap it back to the position illustrated in Fig. 1. Free rotation in the direction of Fig. 1 is thus unrestricted.

However, if the rotor 11 is urged to rotate in the direction of the arrow in Fig. 3, the rotor magnet 24, being stronger than the stator magnet 16, will urge the roller 15 to its most clockwise position. But since the recess 13 is tapered in the direction of movement, the roller 15 will promptly become wedged firmly between the surfaces 23 and 14 of the recess 13 and the rotor 11 respectively. Thus the roller 15 frictionally prevents rotation in the direction shown in Fig. 3.

The inventor claims:

1. In a one way drive mechanism: a pair of relatively movable members, one of said members having a recess facing the surface of said other member, said recess together with said surface defining a wedge-shaped space; a rolling element of magnetic material in said space capable of wedging therein; first magnetic means on said other member for moving said rolling element into wedging relationship upon relative movement of said members in one direction; and a second magnetic means in said one member exerting less magnetic force than said first magnetic means for lifting said rolling element away from said surface, when said element is in unwedged position.

2. In a one way drive mechanism: a pair of relatively rotatable members having a common axis, one of said members having an arcuate recess facing the surface of said other member, said recess together with said surface defining a wedge-shaped space; a rolling element of magnetic material in said space capable of wedging therein; a first magnet on said other member for urging said rolling element into wedging relationship in said space upon relative rotation of said members in one direction; and a second magnet in said one member exerting less magnetic force than said first magnet for lifting said rolling element away from said surface, when said element is in unwedged position.

3. In a coupling device having two relatively movable members and one or more rolling elements of magnetic material that are wedged in a tapered recess between the members when the members are coupled, and that are received in the deep portion of the recess when the members are uncoupled, the combination therewith of: a permanent magnet carried by one of the members and having a pole face exposed at that surface of said one member which is opposed to the other member, for moving the rolling element into wedging relation; and means releasably restraining said rolling elements in the deep portion of the recess.

4. In a coupling device having two relatively movable members and one or more rolling elements of magnetic material that are wedged in a tapered recess between the members when the members are coupled, and that are received in the deep portion of the recess when the members are uncoupled, the combination therewith of: a permanent magnet carried by one of the members and having a pole face exposed at that surface of said one member which is opposed to the other member, for moving the rolling element into wedging relation; and a second permanent magnet on said other member adjacent said deep portion for holding said rolling elements out of rolling contact from said one member when the members are uncoupled.

5. In combination: an inner member; an outer member; one of said members having a recess opening toward the other, said recess having a deep end and a shallow end; a rolling element of magnetic material and cooperating in the recess to wedge between the two members when there is relative rotation in one direction, and rolling out of wedging relation into the deep end of the recess when there is relative rotation in the other direction; and means for ensuring against continuous contact between the rolling element and the said other member, comprising: a permanent magnet on said one of said members having a pole face attracting said element to hold it in the deep end of the recess; and means on the other of said members for urging said element away from the deep end of the recess in response to relative rotation in said one direction.

6. In combination: an inner member; an outer member; one of said members having a recess opening toward the other, said recess having a deep end and a shallow end; a rolling element of magnetic material and cooperating in the recess to wedge between the two members when there is relative rotation in one direction, and rolling out of wedging relation into the deep end of the recess when there is relative rotation in the other direction; and means for ensuring against continuous contact between the rolling element and the said other member, comprising: a permanent magnet on said one of said members having a pole face attracting said element to hold it in the deep end of the recess; and a second permanent magnet on the other of said members having a greater force than said first magnet, and carried by said other member, to urge the element to wedging position in response to relative rotation in said one direction.

7. In combination: an inner member; an outer member; one of said members having a recess opening toward the other, said recess having a deep end and a shallow end; a rolling element of magnetic material and cooperating in the recess to wedge between the two members when there is relative rotation in one direction, and rolling out of wedging relation into the deep end of the recess when there is relative rotation in the other direction; and means for ensuring against continuous contact between the rolling element and the said other member, comprising: a permanent magnet on said one of said members; a non-magnetic housing for said magnet, said magnet having a pole face attracting said element to hold it in the deep end of the recess; and a second permanent magnet; a non-magnetic housing for said second magnet, said second magnet having a greater force than said first magnet, said second permanent magnet being carried by said other member, to urge the element to wedging position in response to relative rotation in said one direction.

HOMER K. HERRICK.

REFERENCES CITED

The following references are of record in the file of this patent:

UNITED STATES PATENTS

| Number | Name | Date |
|---|---|---|
| 2,300,223 | Hottenroth, Jr. | Oct. 27, 1942 |
| 2,410,818 | Grant, Jr. | Nov. 12, 1946 |